United States Patent [19]

Colegrove

[11] 4,157,322

[45] Jun. 5, 1979

[54] WATER DIVERTING GEL COMPOSITIONS

[75] Inventor: George T. Colegrove, San Diego, Calif.

[73] Assignee: Merck & Co., Inc., Rahway, N.J.

[21] Appl. No.: 870,695

[22] Filed: Jan. 19, 1978

[51] Int. Cl.$^2$ ............................................. C08L 1/28
[52] U.S. Cl. ..................... 260/15; 166/270; 166/279; 166/300; 260/9; 260/17 R; 260/17.3; 260/851
[58] Field of Search ................. 260/15, 17.3; 166/270, 166/279, 300

[56] References Cited

U.S. PATENT DOCUMENTS

| | | | |
|---|---|---|---|
| 3,615,794 | 10/1971 | Nimerick | 106/208 |
| 3,727,412 | 4/1973 | Marx et al. | 61/36 R |
| 3,740,360 | 6/1973 | Nimerick | 260/17.4 ST |
| 3,832,229 | 8/1974 | Brow et al. | 427/136 |
| 3,878,141 | 4/1975 | Jackson et al. | 260/17 R |
| 3,887,506 | 6/1975 | Hewitt | 260/17 A |
| 3,943,078 | 3/1976 | James | 260/17 R |
| 3,971,440 | 7/1976 | Hessert et al. | 166/270 |

OTHER PUBLICATIONS

Chem. Absts., vol. 66:106815x, Binder for Soil Stabilizing from Crude Oil, Chuprunov.
Chem. Absts., vol. 69:28982v, Strengthening—Oil and Gas Wells—Urea Formaldehyde Binder, Schved.

*Primary Examiner*—Edward M. Woodberry
*Attorney, Agent, or Firm*—Hesna J. Pfeiffer; Julian S. Levitt

[57] ABSTRACT

This invention relates to the recovery of oil from underground deposits. The invention relates to novel gel compositions consisting of water, a polysaccharide polymer, an acid generating salt and a melamine resin. The invention also relates to the method of utilizing said composition to recovery underground oil.

2 Claims, No Drawings

WATER DIVERTING GEL COMPOSITIONS

BACKGROUND OF THE INVENTION

This invention relates to the recovery of oil from underground deposits. The invention relates to novel gel compositions consisting of water, a polysaccharide polymer, an acid generating salt and a melamine resin. The invention also relates to the method of utilizing said composition to recovery underground oil.

Methods for plugging off, diverting or reducing the rate of undesired fluid movement in porous media make up a substantial amount of technology, including the in-place formation of gels. Such gels are used to plug highly permeable zones in the formation, thus diverting the water or other fluid through the less permeable zones, thereby improving sweep efficiency and providing greater oil recovery. These prior art gels are normally prepared on the surface and are then pumped underground into the formations. A disadvantage of these prior art methods is that the gelled compositions are subjected to shear degradation during the pumping operation as they are pumped through pipes, perforations and fractures. This results in the breakdown of crosslinks and the loss of the gel's ability to plug and maintain impermeability.

SUMMARY OF THE INVENTION

The invention relates to the recovery of oil from underground deposits thereof in which the permeability is non-uniform, resulting in the inefficient recovery of the desired oil product.

We have discovered a composition of matter and a method of utilizing said composition of matter in order to overcome some of the disadvantages of the prior art.

The novel composition of this invention consists of water, a crosslinkable polymer, an acid generating salt and a melamine resin.

The method of utilizing the compositions of this invention are novel in that the heat of the underground formations catalyze the reaction which crosslinks the polysaccharide to a gelled state.

The polymers that can be utilized in this invention are generally those polymers that contain at least one crosslinkable hydroxyl, carboxyl or amide group. It is desirable, of course, to utilize polymers wherein more than one crosslink is possible so that a more highly crosslinked gel can be formed. Polymers that are synthetic, produced by bacteria, by plants or any other method may be utilized if they contain a crosslinkable hydroxyl, carboxyl or amide group.

Crosslinkable polymers that may be utilized in this invention include synthetic polymers such as partially hydrolyzed polyacrylamides. Also included among the polymers that can be utilized in this invention are cellulose and cellulose derivatives such as carboxymethyl cellulose, methyl cellulose, methyl hydroxy propyl cellulose, hydroxy ethyl cellulose or polysaccharides such as xanthan gums, guar gums, locust bean gums, gum tragacanths, alginates and their derivatives.

The polymer may be utilized over a rather broad range of concentrations from about 0.05% by weight based on the water to about 2.0%. However, a more preferred range is from about 0.5% to about 1.5%.

The gelation reaction is catalyzed by a salt which is acid generating upon the application of heat. The gelation reaction occurs under acidic conditions. Another important advantage of this invention is that the solution pH is close to neutral when made up, but when the heat from underground decomposes the salt, an acid is formed in situ, lowering the pH and causing the gelling reaction to occur.

The acid-generating salts that can be utilized in this invention then are those salts which upon being heated decompose to form an acid. Some salts that may be utilized in this invention are the ammonium salts of strong acids such as ammonium chloride, ammonium sulfate, ammonium nitrate, ammonium phosphate monobasic and the like.

The acid-generating salt can be utilized over a range from about 0.5% by weight of water to about 1.0%. A more preferred range is from about 0.1% to about 0.5%.

The melamine resin that is utilized in this invention can be a commercial product such as the reaction product of melamine and formaldehyde. Included among these melamine-formaldehyde (melamine) resins which are useful in this invention are the partially methylated resins and the hexamethoxymethyl resins (i.e. American Cyanamid's Cymel 373, Cymel 370 and Cymel 380). The resin, however, has to be one that is soluble or dispersible in an aqueous medium. The resin concentration by weight based on water is from about 0.3% to about 2.0%. A more preferred range is from about 0.5% to about 1.25%.

The gelation rate of the composition depends on the amount of each of the components and the temperature at which the reaction is conducted. Thus, one can tailor the gel rate and gel strength of the composition by adjusting the amount of the acid-generating salt, the resin amount and the temperature. The higher the temperature at given concentrations of resin, acid-generating salt and polymer will result in a faster gelation time. If one desires a more gelled composition, he may increase the polymer and resin concentrations at a given temperature.

Another aspect of this invention is that the rate of the crosslinking reaction can be accelerated by the addition of formaldehyde to the composition.

The following examples are capable of wide variation and modification, and any minor departure or extension is considered as being within the skill of the artisan and as falling within the scope of this invention.

EXAMPLE 1

A simulated core model packed with coarse gravel is utilized to demonstrate the water-diverting characteristics of the inventive composition.

When plain water is passed through the core model packed with coarse gravel, a high flow rate indictates a permeability of about 6 Darcies.

An aqueous solution containing 0.5% xanthan gum (Kelzan), 0.5% partially methylated melamine formaldehyde resin (Cymel 373), 0.25% monoammonium phosphate, and 0.2% formalin by weight of composition is then injected into the core model containing coarse gravel and the solution allowed to gel for 8 hours at 130° F. An attempt to pass water through the core after the gelled composition indicates a flow rate effectively reduced to about zero which indicates complete plugging of the porous channels.

EXAMPLE 2

An unconsolidated core is simulated by packing a glass model with coarse sand. Water is injected into the core using constant air pressure of about 20 lbs./psi, giving a water flow rate of about 6 cubic centimeters (cc.) per second.

An aqueous plugging solution is prepared containing 5.0 g. xanthan gum, 2.5 g. Cymel 373, 1.25 g. monoammonium phosphate, and 1.0 g. formaldehyde in 490 g. of water. The solution is mixed thoroughly and then injected into the model until all the water is displaced. The model is sealed at both ends and placed in an oven set at 130° F. to permit gelation to occur. After 18 hours, the model containing the gel is tested under the same conditions as described above. The water flow rate is reduced to about zero.

EXAMPLE 3

A glass model similar to the one in Example 2 is tested without the gel composition and the water flow rate at 20 psi is about 7 cc./second.

An aqueous solution is prepared containing 2.5 g. xanthan gum, 2.5 g. Cymel 373, 1.25 g. monoammonium phosphate, 1.5 g. formaldehyde in 492 g. of water. The solution is injected into the model displacing all the water therein, sealed and placed in an oven at 130° F. for 24 hours to permit gelation. Water is again tested in the core model and the flow rate is reduced to about zero at 20 psi.

What is claimed is:

1. A composition of matter comprising water, 0.5 to 1.5% of a cross linkable polymer which is selected from the group consisting of cellulose, carboxymethyl cellulose, methyl cellulose, methyl hydroxy propyl cellulose, hydroxy ethyl cellulose, xanthan gums, guar gums, locust bean gums, gum tragacanths or alginates; 0.1–0.5% of an acid generating salt which is selected from the group consisting of ammonium chloride, ammonium sulfate, ammonium nitrate, or ammonium phosphate monobasic; and 0.5–1.25% of a partially methylated melamine formaldehyde resin.

2. The composition of claim 1 in which 0.2–0.3% formaldehyde is optionally present.

* * * * *